Nov. 14, 1961 G. H. RENDEL 3,008,329
METHOD OF TESTING RESIN COATED METAL SHEETS
Original Filed Oct. 17, 1956
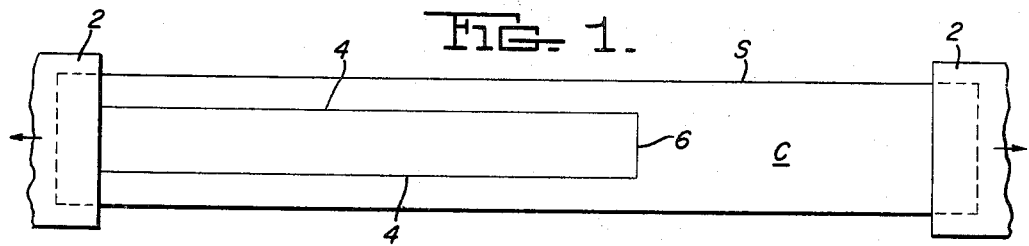
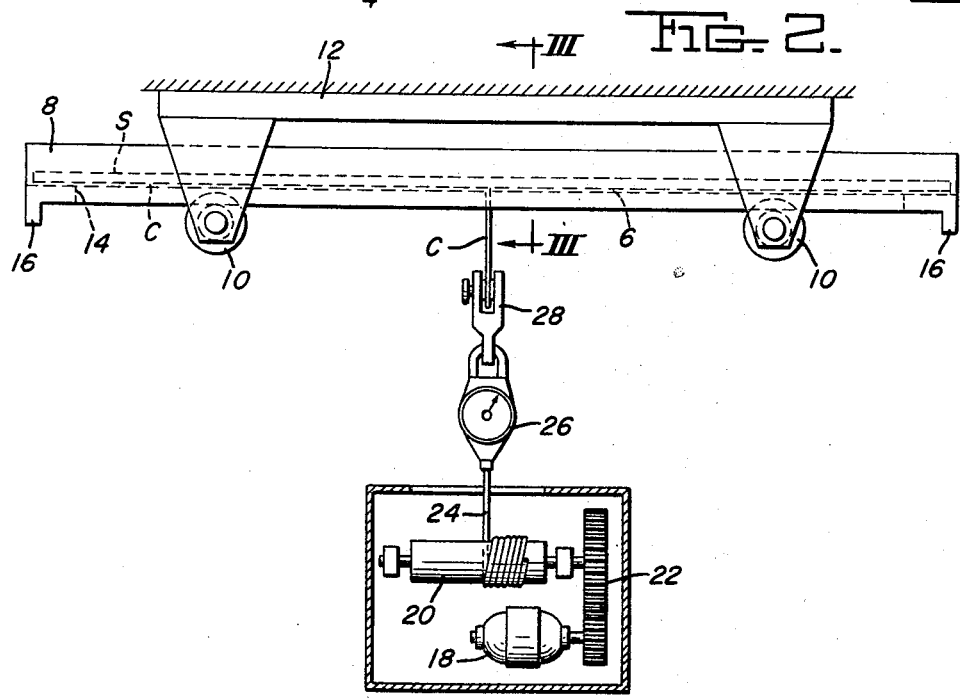
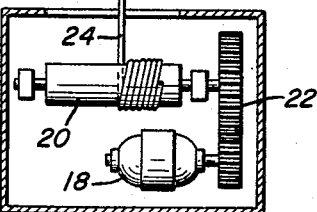
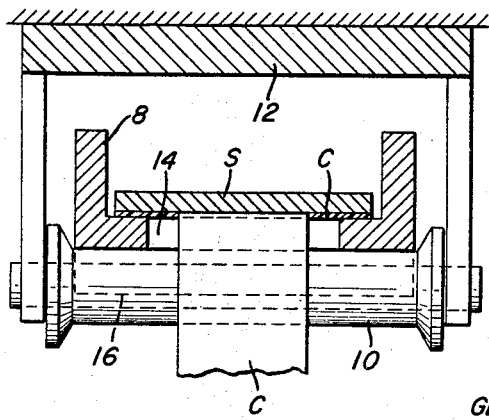
INVENTOR
GEORGE H. RENDEL,
By: Donald G. Dalton
his Attorney.

United States Patent Office 3,008,329
Patented Nov. 14, 1961

3,008,329
METHOD OF TESTING RESIN COATED METAL SHEETS
George H. Rendel, Pittsburgh, Pa., assignor to United States Steel Corporation, a corporation of New Jersey
Original application Oct. 17, 1956, Ser. No. 616,479, now Patent No. 2,971,374, dated Feb. 14, 1961. Divided and this application May 9, 1960, Ser. No. 27,844
1 Claim. (Cl. 73—150)

This application, which is a division of my co-pending application, Serial No. 616,479, filed October 17, 1956, now Patent No. 2,971,374, relates to a method of testing resin coated metal sheets—particularly to sheet metal which has been coated with organic material such as vinyl resin films, plastisols, organisols and lacquers. I have found that while a satisfactory bond may exist between the base metal and the coating as originally applied the bond may be lost or decreased when the coated sheet is elongated, bent, fabricated into commercial shapes or subjected to heat or contact with chemicals. I have found that a coated sheet drawn to a degree equivalent to a six inch diameter cup three inches deep may require a bond between the base metal and coating that retains satisfactory adhesion after the coating material has been elongated 25%. It is also possible to determine the relationship between other degrees of draws and the coating adhesion requirements. Prior to the development of my invention no method was available for suitable testing resin coated sheets for commercial operation.

It is therefore an object of my invention to provide a method of testing resin coated sheets to determine the suitability of the sheet for commercial operations.

This and other objects will be more apparent after referring to the following specification and attached drawings, in which:

FIGURE 1 is a schematic view of a test sample being elongated in a tensile testing machine;

FIGURE 2 is a schematic view showing apparatus suitable for carrying out my invention; and FIGURE 3 is an enlarged view taken on the line III—III of FIGURE 2.

Referring more particularly to the drawings, reference numeral 2 indicates the jaws of a tensile testing machine having a test sample S therein. The test sample S may be of the usual size and consists of a base material, which is preferably a steel sheet, and a coating C. Prior to being placed in the testing machine the sample S may be subjected to other conditions that simulate those to which the material will be subjected when used commercially. The sheet S is pulled to the desired elongation after which parallel cuts 4 are made in the coating C down to the base material and an end cut 6 is made to connect the ends of the cuts 4. In order to obtain suitable results it is necessary that the cuts 4 and 6 extend completely through the coating C. The end of the coating material at the cut 6 is then severed from the base material by means of a sharp tool. The sample is then placed in the apparatus shown in FIGURES 2 and 3. This apparatus includes a carriage 8 which is mounted on rollers 10 for free movement therealong. The rollers 10 are suspended from framework 12. As best shown in FIGURE 3 the carriage 8 is U-shaped and has a longitudinal slot 14 therein which is somewhat wider than the distance between the grooves 4. Abutments 16 are provided on the carriage 8 to prevent it from leaving the rollers 10. Mounted below the carriage 8 is a constant speed motor 18 connected to a cable drum 20 by means of gearing 22. A flexible cable 24 is attached to and wound around drum 20. The end of cable 24 has a spring scale or dynamometer 26 attached thereto which in turn is connected to a clamp 28. The sample S is laid in the carriage 8 with the coating C facing the motor 18 and its free end extending downwardly through the opening 14. The free end is gripped in the clamp 28 and motor 18 is then energized. As the drum 20 revolves the clamp 28 pulls on the coating C and the resulting tension moves the carriage so that the point of coating separation is always directly above the pulling point on the drum 20, thereby assuring that the coating ribbon is pulled at right angles to its base metal. The magnitude of the pulling tension is indicated on scale 26. The sample S is preferably one inch wide and sixteen inches long and may be as long as, longer than, or shorter than the length of carriage 8. In many instances the coating material will break before the force is sufficient to pull the coating from the base material. When this occurs with a thick coating it is an indication that the bond or adhesion between the base metal and coating is strong enough to serve its intended purpose. However, when testing a thin coating the bond may not be strong enough for the intended purpose when the coating breaks. When this occurs a similar test sample is subjected to a greater extension in the tensile testing machine and again tested in the mechanism of FIGURES 2 and 3. This operation is repeated for other test samples at different percentages of elongation and a curve can then be drawn indicating the relationship between percent elongation and pulling load. By extending this curve it can be determined whether the material will be suitable at the lower elongation. Such a curve can also be determined when it is desired to have a clear indication of the adhesive qualities of the coating over a wide range of values. On one particular type of material I have found that the pulling force necessary to separate the plastic coating from the base material should be at least equal to the tensile strength of a plastic coating 0.012 inch thick or between twenty-two and twenty-six pounds per linear inch of width when the coating film is pulled at a fixed rate of ½ inch per minute. The twenty-two pound value may be increased or decreased if desired to conform to the tensile strength of other coating materials.

While one embodiment of my invention has been shown and described it will be apparent that other adaptations and modifications may be made without departing from the scope of the following claim.

I claim:

The method of testing resin coated metal sheets which comprises elongating the sheet under a predetermined tension, providing generally parallel cuts in the coating on the sheet down to the base metal, separating the coating from the base metal at one end of the cuts, then pulling the separated end of the coating, and determining the amount of pulling tension required to separate the coating from the metal.

References Cited in the file of this patent
UNITED STATES PATENTS
2,473,517    Freedman _____ June 21, 1949
FOREIGN PATENTS
610,232      Great Britain _____ Oct. 13, 1948